Aug. 14, 1928.

V. G. VAUGHAN

WAFFLE IRON

Filed May 11, 1927

1,680,402

WITNESSES

INVENTOR
Victor G. Vaughan

BY
Wesley G. Carr
ATTORNEY

Patented Aug. 14, 1928.

1,680,402

UNITED STATES PATENT OFFICE.

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA.

WAFFLE IRON.

Application filed May 11, 1927. Serial No. 190,430.

My invention relates to electrically heated appliances and particularly to electrically heated waffle irons.

An object of my invention is to provide a relatively simple, inexpensive, highly efficient and easily replaceable heating unit for a waffle iron.

In practicing my invention, I associate with a waffle iron embodying the usual casings and waffle molds, a heating unit embodying a resilient sheet metal plate of dished form and so shaped as to provide an annular groove near the periphery of the plate. A resistor is held in the groove by expansively-oxidized electric-insulating material and a single element is provided to clamp the heating unit plate against the waffle mold and to hold these elements in proper operative positions within a casing.

Figure 1:
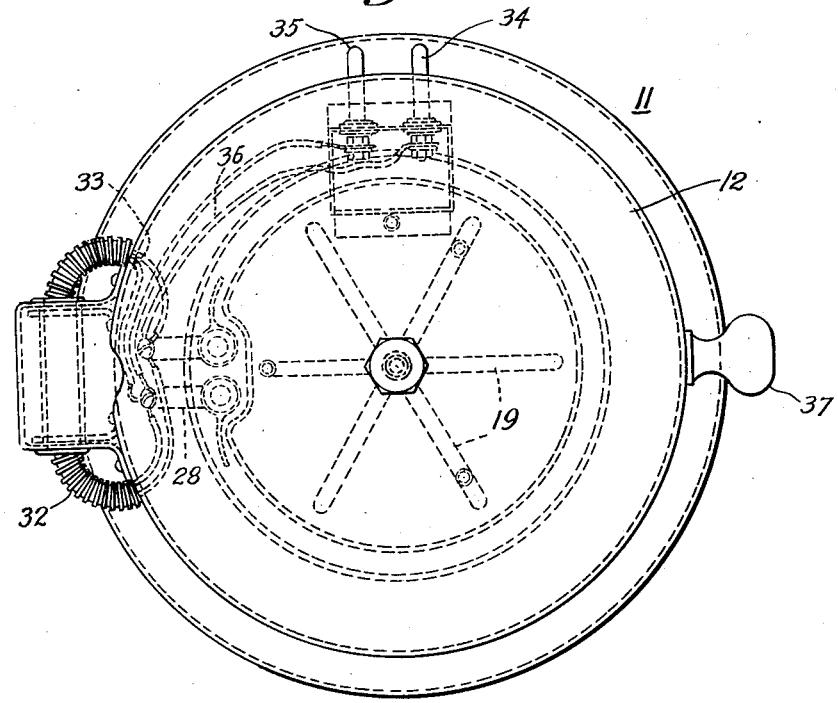
Figure 2:
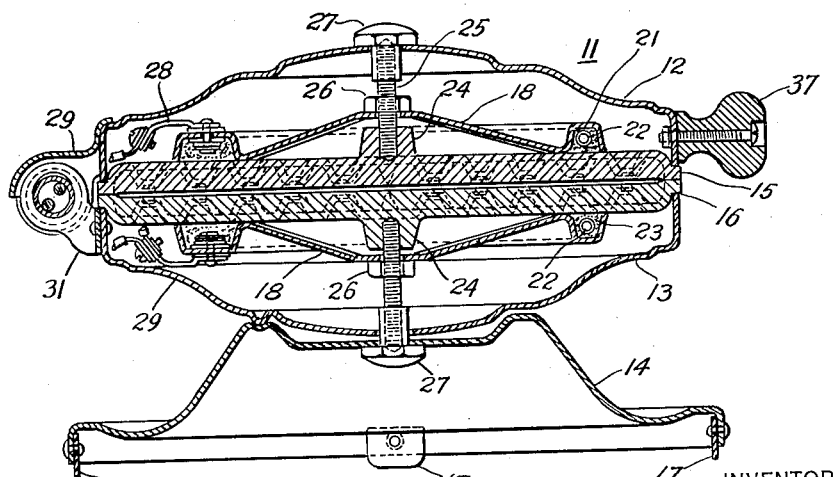

In the single sheet of drawings,

Figure 1 is a top plan view of a waffle iron with which is associated a heating unit embodying my invention, and Fig. 2 is a view in vertical section therethrough.

An electrically heated waffle iron 11 comprises a suitable upper casing 12, a lower casing 13 and a hollow base 14. The two casings may be of any suitable design and contour, but are here shown as circular in shape although I do not desire to be limited thereto.

A waffle mold 15 is provided for the upper casing and a substantially similar waffle mold 16 is provided for the lower casing, which molds are of a size and contour to fit into the respective casings in the manner shown more particularly in Fig. 2 of the drawings. The operative surface of the respective molds are of any suitable kind usually employed in the art, while the inner or rear surfaces thereof are preferably made smooth.

The hollow base 14 is provided with a number of supporting members 17, which may be made of a heat-insulating material and which extend below the bottom rim of the base in order to raise the same above the surface of a table upon which the waffle iron is being used.

A heating unit is operatively associated with each of the waffle molds and embodies in general a dished sheet metal member 18, the central portion of which is provided with a plurality of radially extending grooves 19 in order that a sufficiently stiff but resilient construction shall be obtained. The member 18 is provided at its periphery with a relatively deep groove 21 for receiving a heating unit comprising a resistor wire 22 wound in substantially helical shape and held within the grooved portion by expansively oxidized electric-insulating material 23. This filling of electric insulating material is produced by the method disclosed and claimed in reissue Patent No. 16,340 to C. B. Backer.

Briefly, the method disclosed and claimed in the above numbered patent, comprises surrounding the helically wound resistor with a helically wound strip of initially metallic magnesium, after which the resistor and its envelope of magnesium are placed within the groove 21 and the assembled structure is then subjected to the action of either high pressure steam or of hot water, heated in an enclosed casing. The action of this process is to change the initially metallic magnesium to a crystalline structure of magnesium hydroxide. The volume of hydroxide is substantially 200% that of the initially metallic magnesium. This action provides a means for tightly holding the resistor wire within the groove and also provides a highly efficient path for conducting the heat generated in the resistor wire to either the walls of the groove or to an object in engagement therewith, such as the waffle mold shown in the drawings.

Each waffle mold is provided with a central projection or lug 24, integral with the mold and located at the rear surface thereof, into which a screw threaded stud 25 extends. A nut 26 is mounted on the outer portion of this stud and is screwed against the outer surface of the central portion of the disk 18 in order to clamp it tightly against the rear surface of the waffle mold.

The stud 25 is made of such a length as to receive an ornamental nut having an enlarged portion located on the outside of the casing in order that by screwing down the nut 27 on the stud 25, the waffle mold may be tightly clamped against the rim portion of the cooperating casing.

Terminal strips 28 and 29 are provided for the two heating units hereinbefore described, two such terminal strips being provided for each heating unit, the inner end portions of the respective terminal strips being supported by and insulated from the rear surface of the dished member 18 and connected to the respective ends of the resistor wire 22. These terminal members are suitably insulated from the member 18 and as they form no part of my invention, they are not further described in detail.

The upper and lower casing members are provided with cooperating hinged portions 29 and 31 which may be of any suitable or desired type, but are preferably so made as to embody a hollow hinge pin through which extends a flexible armored conduit, or a coiled spring 32, within which are located connecting conductors 33, which are suitably connected to the respective terminal strips 28 and 29. Terminal pins 34 and 35 are insulatedly mounted on the hollow base 14 and are connected by conductors 36 to the terminal strips 28 and 29 in order to permit of energizing the resistor wires 22 when the terminal pins 34 and 35 are connected to a suitable source of supply in a manner well known in the art.

A knob or actuating handle 37, is provided on the upper casing 12 in order to permit of raising and lowering the same during the operation of the device.

It is obvious that there will be a relatively large amount of heat radiated from the peripheral edge portions of the casings and more particularly of the waffle molds, and the diameter of the substantially circular groove 21 bears a definite ratio to the diameter of the waffle molds. This ratio is such that a substantially uniform heat distribution is obtained over the entire baking surface of the waffle molds, so that any waffle baked therebetween will be baked substantially uniformly over its entire surface.

The device embodying my invention thus provides a heating unit which can be manufactured entirely separate from and independently of, the other parts of the waffle iron and which can be operatively associated therewith very quickly and easily, and whose structure is such that it will permit of slight relative expansion movement because of the heating and cooling of the various parts of the waffle iron during operation thereof. A heating unit of this kind can be replaced easily and quickly.

Various modifications may be made in the device embodying my invention without departing from the spirit and scope thereof and I desire that only such limitations shall be placed thereon as are imposed by the prior art or are set forth in the appended claims.

I claim as my invention:

1. In an electrically heated appliance, the combination with a baking surface, of a dished, resilient sheet metal plate having its peripheral portion shaped to provide a groove, a resistor element in said groove, expansively-oxidized electric-insulating material in said groove for tightly holding the resistor therein, and means for clamping the grooved surface of the plate against one side of the baking surface.

2. In a waffle iron, the combination with a plane baking surface of substantially circular contour, and a casing therefor, of a resilient sheet metal plate shaped to provide an annular groove in one face thereof, a resistor member in said groove, expansively-oxidized electric-insulating material surrounding said resistor to tightly hold it therein, the annular groove being of such diameter to permit the energized resistor to heat the baking surface to a uniform temperature, and a single means for clamping the sheet metal plate against the baking surface and for holding them in the casing.

In testimony whereof, I have hereunto subscribed my name this 29 day of April, 1927.

VICTOR G. VAUGHAN.